(12) United States Patent
Neubauer et al.

(10) Patent No.: US 9,149,972 B2
(45) Date of Patent: Oct. 6, 2015

(54) BLOW MOULDING MACHINE WITH A STERILE CHAMBER AND HEATING

(75) Inventors: Michael Neubauer, Regensburg (DE); Juergen Soellner, Beratzhausen (DE)

(73) Assignee: KRONES AG (DE)

( * ) Notice: Subject to any disclaimer, the term of this patent is extended or adjusted under 35 U.S.C. 154(b) by 241 days.

(21) Appl. No.: 13/402,656

(22) Filed: Feb. 22, 2012

(65) Prior Publication Data

US 2012/0248659 A1 Oct. 4, 2012

(30) Foreign Application Priority Data

Mar. 4, 2011 (DE) .......................... 10 2011 013 121

(51) Int. Cl.
*B29C 49/46* (2006.01)

(52) U.S. Cl.
CPC ......... *B29C 49/46* (2013.01); *B29C 2049/4679* (2013.01); *B29C 2049/4697* (2013.01)

(58) Field of Classification Search
CPC ...... B29C 49/28; B29C 49/42; B29C 49/421; B29C 49/4273; B29C 2049/4635; B29C 2049/4679
USPC .................................................. 264/525, 535
See application file for complete search history.

(56) References Cited

U.S. PATENT DOCUMENTS

| | | | | |
|---|---|---|---|---|
| 2,354,029 | A * | 7/1944 | Kingston | 425/168 |
| 5,114,670 | A * | 5/1992 | Duffey | 422/24 |
| 6,116,888 | A | 9/2000 | Johnston et al. | 425/195 |
| 2009/0071104 | A1 * | 3/2009 | Fischer | 53/426 |
| 2010/0089009 | A1 | 4/2010 | Till | 53/452 |
| 2011/0037188 | A1 * | 2/2011 | Hirdina | 264/39 |
| 2011/0133369 | A1 * | 6/2011 | Martini et al. | 264/523 |
| 2011/0133370 | A1 * | 6/2011 | Engelhard et al. | 264/535 |
| 2012/0070340 | A1 * | 3/2012 | Voth | 422/28 |
| 2012/0225156 | A1 * | 9/2012 | Geltinger et al. | 425/524 |
| 2012/0225158 | A1 * | 9/2012 | Voth et al. | 425/540 |

FOREIGN PATENT DOCUMENTS

| | | | |
|---|---|---|---|
| DE | 102007017938 | 10/2008 | ............... A61L 2/00 |
| EP | 2388129 | 11/2011 | |
| EP | 2431058 | 3/2012 | |
| JP | 2003512260 | 4/2003 | ............... A61L 2/06 |
| WO | WO9718154 | 5/1997 | ............... B67C 3/00 |
| WO | WO2010020529 | 2/2010 | ............... A61L 2/20 |

OTHER PUBLICATIONS

European Search Report issued in corresponding application No. 12158115.1-2307, dated Jun. 25, 2012 (7 pgs).
German Search Report, dated Jan. 27, 2012 (5 pgs).
Chinese First Office Action (translated) issued in related application No. 2012100479356, dated Jan. 23, 2014 (14 pgs).

* cited by examiner

*Primary Examiner* — Matthew Daniels
(74) *Attorney, Agent, or Firm* — Hayes Soloway P.C.

(57) ABSTRACT

An apparatus for shaping preforms of plastic includes a plurality of shaping stations arranged on a movable carrier. The shaping stations each have blowing molds which are arranged in blowing mold carriers and serve to accommodate the preforms of plastic. The shaping stations are conveyed within a clean chamber which is separated from its surroundings by of at least one wall. A sterilization device charges regions lying within the clean chamber with a flowable sterilization agent for sterilization thereof.

19 Claims, 2 Drawing Sheets

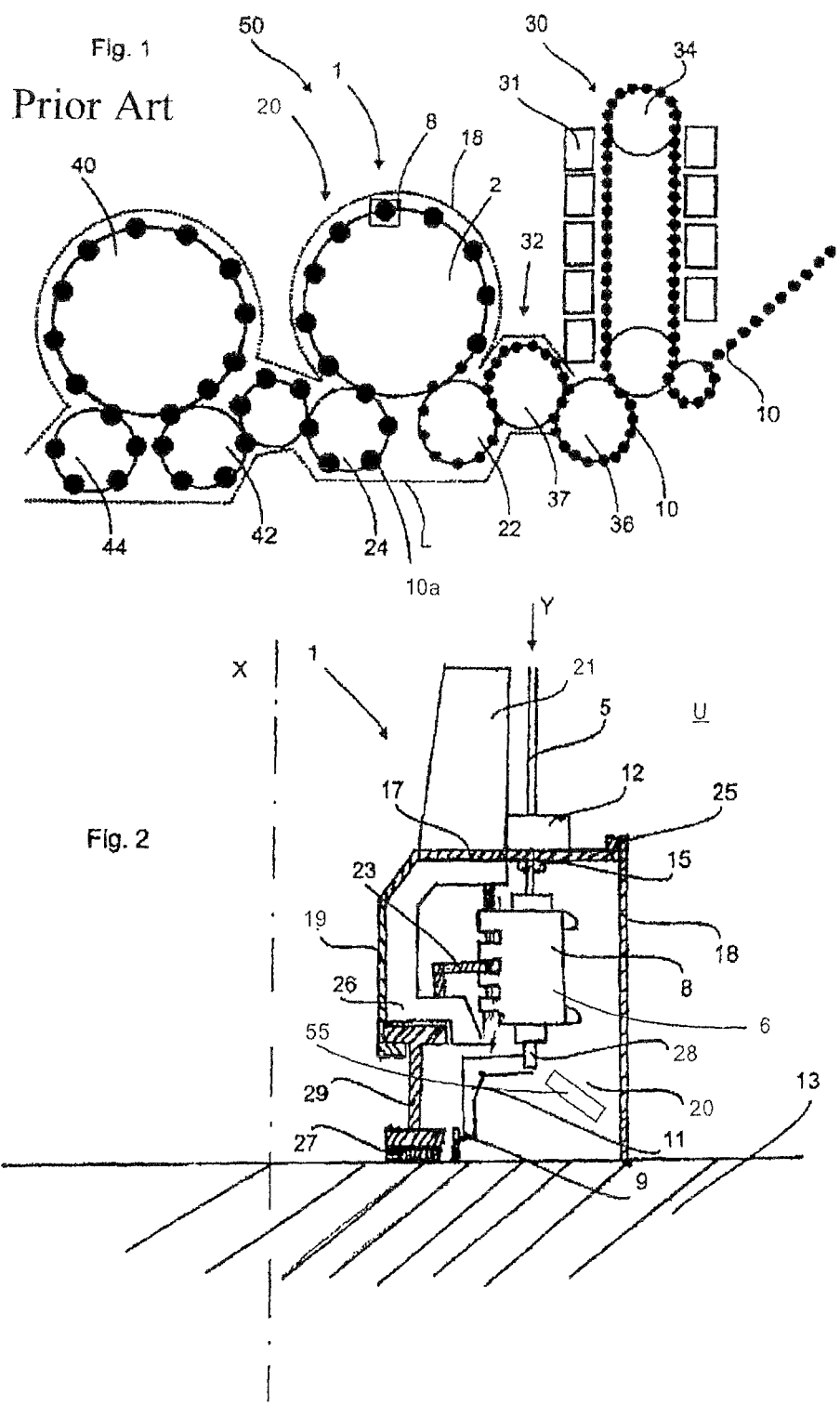

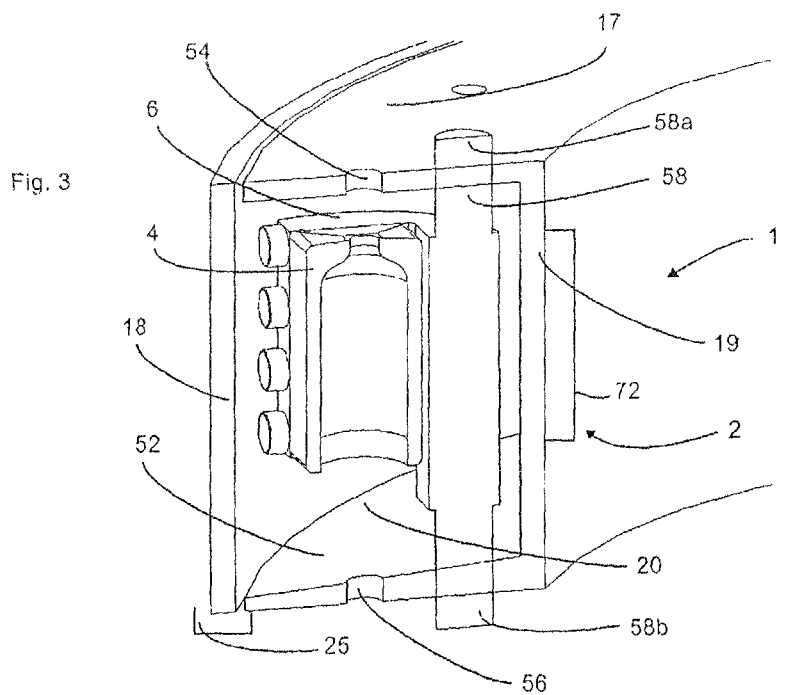
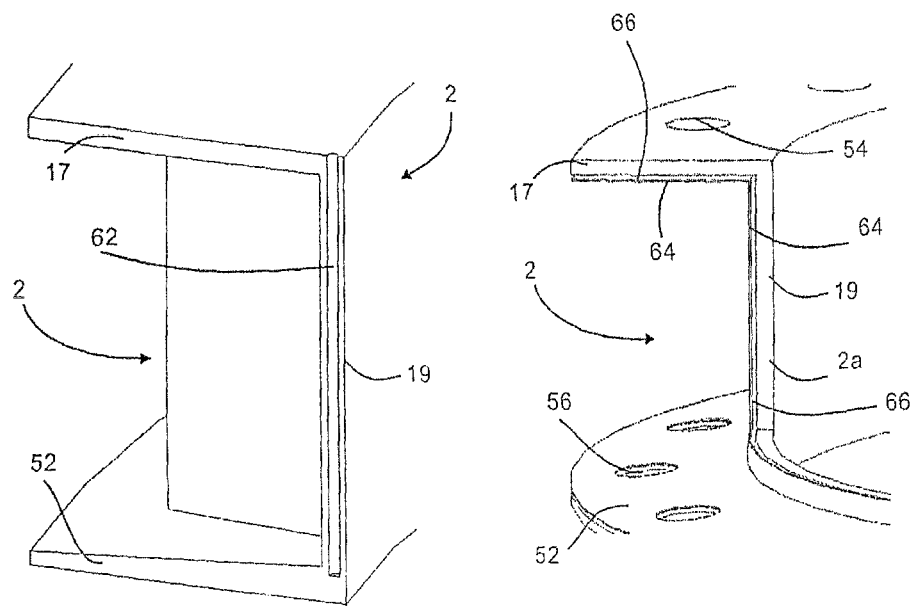

BLOW MOULDING MACHINE WITH A STERILE CHAMBER AND HEATING

FIELD OF THE INVENTION

The present invention relates to an apparatus for shaping preforms of plastic to give containers of plastic and to a process for shaping preforms of plastic to give containers of plastic. Such apparatuses and processes have been known from the prior art for a long time. In this context, for certain uses it is necessary to shape the preforms of plastic under aseptic conditions to give containers of plastic. In some countries guidelines are established for such aseptic treatments. Thus, for example, in the USA such guidelines are established and monitored by the FDA (Food and Drug Administration).

BACKGROUND OF THE INVENTION

For this purpose, the preforms of plastic are conveyed within a clean chamber and shaped to give containers of plastic during this conveying. Specifically, in this context the preforms of plastic are conveyed within blowing moulds and shaped in these blowing moulds by charging with a gaseous medium, and in particular with blowing air. WO 2010 020 529 A2 discloses such an aseptic blow moulding machine. This comprises, inter alia, a clean chamber in which the blow moulding stations or shaping stations are arranged. The subject matter of WO 200 020 529 A2 is herewith included completely in the subject matter of the present description by reference.

In order to establish a clean chamber atmosphere, inter alia sterilization of the internal chamber, i.e. of this clean chamber (which is also called an isolator), is necessary. In this context, this is conventionally carried out with the aid of gaseous $H_2O_2$ (hydrogen peroxide) or possibly also peracetic acid. However, in this context an undesirable condensing of the $H_2O_2$ on regions of the clean chamber may occur, in particular on isolator walls and installed components, such as, for example, the mould carriers.

The present invention is based on the object of providing a blow moulding machine which allows an improved sterilizing of the clean chamber.

SUMMARY OF THE INVENTION

An apparatus according to the invention for shaping preforms of plastic to give containers of plastic has a plurality of shaping stations which are arranged on a movable carrier, wherein the shaping stations each have blowing moulds which are arranged in blowing mould carriers and serve to accommodate the preforms of plastic and within which the preforms of plastic can be shaped to give the containers of plastic. The apparatus furthermore has a clean chamber, within which the blowing moulds or the shaping stations are conveyed or can be conveyed, wherein this clean chamber is separated from the surroundings by means of at least one wall. In addition, the apparatus also has a sterilization device which charges regions and/or components lying within the clean chamber (preferably walls and/or elements of the shaping stations) with a flowable sterilization agent for sterilization thereof. According to the invention, the regions to be sterilized can be heated at least in part.

It is therefore proposed that certain or several of the regions to be sterilized are heated in order to facilitate the sterilization. The heating of these regions is therefore advantageously carried out precisely for the purpose of sterilization. Advantageously, the regions are heated to at least 50°, especially if hydrogen peroxide ($H_2O_2$) is used, since this temperature lies above the dew point of this substance. The use of these temperatures therefore helps to prevent condensing of the $H_2O_2$, for example on the isolator walls and the installed components.

The heated regions can be, for example, walls which form the boundary of the clean chamber. In addition, however, they can also be other regions or elements which are within the clean chamber, such as, for example, blowing moulds or elements thereof, blowing mould carriers, carrier trays, blow moulding dies, stretching rods and the like.

In a further advantageous embodiment, the sterilization device is arranged inside the clean chamber. In this context it is possible for the sterilization device to be constructed, for example, as a charging device, such as, for example, as a die, which charges the particular regions of the clean chamber, such as the internal walls or also the mould carriers, with the sterilization agent. In this context, the charging device can be arranged, for example, in a stationary manner, and in particular can charge the parts of the clean chamber which are movable relative to the charging devices. It would also be possible for the sterilization device to be arranged in a movable manner, in order in particular to charge the regions of the clean chamber which are arranged in a stationary manner with the sterilization agent. In a further advantageous embodiment, a plurality of such charging devices, which together form the said sterilization device, is arranged inside the clean chamber. Advantageously, a reservoir is provided, which supplies the sterilization device with sterilization agent, and this reservoir is particularly preferably arranged outside the clean chamber.

In a further advantageous embodiment, at least two of the walls which form the boundary of the clean chamber are movable relative to one another. It is thus possible for an external wall to be of a standing configuration and for the internal wall to be formed, for example, by the carrier or the blow moulding wheel and to move. In this context, sealing devices, such as, for example, water locks, can be arranged between the wall which are movable relative to one another.

In this context, the walls in particular which belong to the carriers or the blow moulding wheel are advantageously to be heated. This is based on the fact that these carriers have a very high mass and heating is therefore particularly significant.

Advantageously, at least one of the walls forming the boundary of the clean chamber is formed by the carrier or a region of the carrier, for example the carrier can have a C-shaped structure with an upper and lower flange, at least one of these walls being heated. Advantageously, at least two walls of the clean chamber and particularly preferably at least three walls of the clean chamber are formed by the carrier. In a further advantageous embodiment, all the movable walls of the clean chamber are formed by the carrier. In this context, these walls can form a circulating recess in which the particular shaping stations are arranged.

In a further advantageous embodiment, the apparatus has an electrically operated heating device for heating the regions. Thus, for example, heating mats or heating wires which heat parts of the walls, for example those walls which are formed by the carrier, can be arranged in the apparatus. In particular, such heating devices can be arranged on a side of the blow moulding wheel or carrier facing away from the clean chamber. This prevents the components being heated from having themselves to be arranged in the clean chamber. In a further advantageous embodiment, the apparatus has feed devices in order to blow a heated medium, such as, for example, hot air, into the clean chamber. In this context, this blowing in of heated air can take place before the sterilization operation. The carrier is advantageously a rotatable carrier, which is also called a blow moulding wheel in the following.

A problem in the context of the sterilization is the high mass of this blow moulding wheel, which makes rapid heating up difficult. An appropriately massive construction of the blow moulding wheel is advantageous, however, since it must mount the mould carriers reliably and without tolerances, and this in particular also on application of a blowing pressure of up to 40 bar. It is thus possible, for example, to install electrical heating devices, such as heating mats, on the blow moulding wheel (and there advantageously on the side facing away from the clean chamber). These accelerate the heating of the blow moulding wheel. However, it would also be possible to provide a steam-operated heating device.

In a further advantageous embodiment, bores for carrying a temperature control medium are provided in the carrier or on one of the other walls and/or on constituents of the shaping stations. In this case a heating medium (e.g. steam) can be passed through the bores in the carrier or blow moulding wheel. Heating up of the carrier to the required temperature can also be accelerated by this means. Advantageously, both a region of the carrier is heated and heated air is introduced into the clean chamber.

However, other procedures for the heating are also conceivable. Primary energy could thus be used for the heating, or the waste air from an oven upstream of the blow moulding machine could be used for the heating. This heated air from the oven could be used to charge the blow moulding wheel from the outside for heating thereof. In addition, the heated air could also be used using the ventilation system (which is in any case present) in order to heat the clean chamber from the inside or outside. In this context, sterile filters could also be used in a feed line of the heated air. In addition, a cooling device, which cools constituents such as e.g. a blowing mould base during operation, could also be used to heat these components before or during a sterilization operation.

In a further advantageous embodiment, the carrier has a base body and, on a surface facing the clean chamber, a temperature control body arranged in a predetermined position with respect to the base body. As mentioned above, hot air is advantageously blown into the clean chamber via the ventilation system before the sterilization. The intention of this is to ensure that all the components in the isolator are heated up to the required temperature. Since this, as mentioned, is difficult in the case of the carrier or blow moulding wheel because of the massive construction thereof, in the context of this embodiment it is proposed that the blow moulding wheel is designed in a sandwich construction.

In this context, the base body or the base structure can continue to be massive in construction. However, a further layer (i.e. the temperature control body) is added inside, i.e. there where the clean chamber is located. In this context, this can be, for example, a further sheet metal layer of considerably lower wall thickness. Advantageously, an insulating medium is formed or an insulating medium (in particular for thermal insulation) is arranged between the base body and the temperature control body. Thus, for example, an air cushion which has an insulating effect can be formed between the base body and the temperature control body. This temperature control medium or the thin sheet metal layer can be heated relatively rapidly. The base body and the temperature control body are therefore advantageously at a distance from one another.

Instead of the air cushion, however, one or more layers of insulating material could also be employed between the base body and the temperature control body. With this additional temperature control body it is no longer necessary to produce the entire blow moulding wheel from a special material, such as, for example, Niro. Less expensive structural steel can be used. However, the temperature control body is advantageously made of a material which can be easily heated, such as, for example, of Niro.

In a further advantageous embodiment, the mould carriers holding the blowing moulds also have bores for carrying a temperature control medium, and in particular for carrying a temperature control medium for heating the mould carriers. Advantageously, the mould carriers also have (or the apparatus also has) a feed device in order to feed a heated temperature control medium to these bores. A reservoir for the temperature control medium is advantageously arranged outside the clean chamber.

In this context it would be possible, for example, to employ the cooling bores which cool the blowing moulds during the production operation. These cooling bores often have hoses, pipes and the like leading outwards, in order to be able to feed in and remove the cooling media. This cooling apparatus can be used during the sterilization operation in order to heat the mould carriers.

The present invention furthermore relates to a process for shaping preforms of plastic to give containers of plastic, wherein the preforms of plastic are conveyed with a plurality of shaping stations, which are arranged on a movable carrier, and the preforms of plastic are arranged in blowing moulds in order to be expanded there to give the containers of plastic. In this context, the shaping stations are conveyed within a clean chamber, which clean chamber is separated off from the surroundings by means of at least one wall. Furthermore, during the sterilization operation regions of the apparatus which are arranged within the clean chamber are charged with a flowable sterilization medium by a sterilization device.

According to the invention, at least sections of regions to be sterilized are heated. Advantageously, in this context the regions to be sterilized are heated for the purpose of this sterilization. In this context, this heating can take place before and/or also during the sterilization operation.

With respect to the process, it is therefore also proposed to heat parts of the clean chamber or also of the shaping stations before the sterilization and in particular for the purpose of the sterilization.

In a preferred process, the regions are heated to a temperature which is greater than 40° C., preferably greater than 45° C. and particularly preferably greater than 50° C.

Preferably, the regions are heated to the temperature which lies above the dew point of the particular sterilization agent used.

In a further advantageous process, the heating is carried out electrically and/or by a flowable temperature control medium.

Further advantages and embodiment can be seen from the attached drawings. In these:

BRIEF DESCRIPTION OF THE DRAWINGS

FIG. 1 shows a diagrammatic representation of an installation for production of containers of plastic;

FIG. 2 shows a view of a clean chamber in the region of a shaping station;

FIG. 3 shows a detailed representation of an apparatus according to the invention in a first embodiment;

FIG. 4 shows a detailed representation of the apparatus in a second embodiment; and FIG. 5 shows a further detailed representation of a device according to the invention.

DETAILED DESCRIPTION OF THE INVENTION

FIG. 1 shows a diagrammatic representation of an installation for production of containers of plastic. This installation 50 has a heating device 30 in which preforms of plastic 10 are heated. These preforms of plastic 10 here are led by means of a conveying device 34, such as here a circulating chain, through this heating device 30 and are thereby heated with a plurality of heating elements 31. This heating device 30 is followed by a transfer unit 36 which transfers the preforms 10 to a sterilization device 32. This sterilization device 32 here likewise has a conveying wheel 37 and sterilization elements can be arranged on this conveying wheel 37, or also in a stationary manner. In this region, for example, sterilization by hydrogen peroxide gas or also by electromagnetic or UV radiation is possible. In particular, an internal sterilization of the preforms is carried out in this region.

Reference symbol 20 designates a clean chamber in its entirety, the outer boundaries of which are indicated here by the dotted line L. In a further preferred embodiment the clean chamber 20 is arranged not only in the region of the conveying wheel 2 and filling device 40, but possibly already starts in the region of the heating device 30, the sterilization device 32, the feed line of the preforms of plastic and/or the production of the preforms of plastic. It can be seen that this clean chamber 20 starts in the region of the sterilization unit 32. Lock devices can be provided in this region in order to introduce the preforms of plastic into the clean chamber 20 without too much gas thereby flowing within the clean chamber and being lost in this way.

As indicated by the broken line L, the clean chamber is adapted to the outer shape of the individual components of the installation. The volume of the clean chamber can be reduced in this manner.

Reference symbol 1 designates a shaping apparatus in its entirety, in which a plurality of blow moulding stations or shaping stations 8 is arranged on a conveying wheel 2, only one of these blow moulding stations 8 being shown here. The preforms of plastic 10 are expanded into containers 10a with these blow moulding stations 8. Although not shown here in detail, the entire region of the conveying device 2 is not within the clean chamber 20, but the clean chamber 20 or isolator is realized to a certain extent as a mini-isolator within the entire apparatus. It would thus be possible for the clean chamber to be of channel-like construction at least in the region of the shaping apparatus 1.

Reference symbol 22 refers to a feed device which transfers the preforms to the shaping device 1, and reference symbol 24 refers to a removal device which removes the containers of plastic 10a produced from the shaping apparatus 1. It can be seen that the clean chamber 20 has recesses in each case in the region of the feed device 22 and the removal device 24, which accommodate these devices 22, 24. In this manner, a transfer of the preforms of plastic 10 to the shaping apparatus 1 or a taking over of the containers of plastic 10a from the shaping apparatus 1 can be achieved in a particularly advantageous manner.

The expanded containers of plastic are transferred to a filling device 40 with a transfer unit 42, and are then removed from this filling device 40 via a further conveying unit 44. The filling device 40 here is also within the said clean chamber 20. In the case of the filling device also, it would be possible for the entire filling device 40 with, for example, a reservoir for a drink not to be arranged completely within the clean chamber 20, but here also only those regions in which the containers are actually led. In this respect, the filling device could also be constructed in a similar manner to the apparatus 1 for shaping preforms of plastic 10.

As mentioned, the clean chamber 20 is reduced to a smallest possible region in the region of the apparatus 1, namely essentially to the blow moulding stations 8 themselves. Due to this small construction design of the clean chamber 20 it is possible for a clean chamber to be produced altogether more easily and faster, and maintaining sterile conditions in the operating phase requires less outlay. Also, less sterile air is needed, which leads to smaller filter installations and the risk of uncontrolled eddy formation is also reduced.

FIG. 2 shows a detailed representation of the apparatus 1 in the region of a blow moulding station 8. A plurality of such blow moulding stations 8 is moved in rotation around an axis X with a conveying device 2 or a carrier. The blow moulding station 8, as can be seen in FIG. 2, is led within the clean chamber 20, which is of channel-like construction here. This clean chamber 20 is closed off by a movable side wall 19 and a cover 17 constructed as one part with this side wall 19. This side wall 19 and the cover 17 here rotate together with the blow moulding station 8.

Reference symbol 18 refers to a further wall which forms the boundary of the clean chamber 20. This wall 18 here is an outside wall which is arranged in a stationary manner. Between the cover 17 and the wall 18 a sealing device 25 is provided, which seals off from one another the elements 17 and 18 which are movable relative to one another, for example, as mentioned above, using a water lock. The lower region of the wall 18 is arranged in a fixed and sealed-off manner on a base 13. Within the clean chamber 20 and here directly adjoining the wall 19 a carrier 76 is provided, which likewise moves in rotation and on which in turn a holding device 23 which holds the blow moulding station 8 is provided.

Reference symbol 11 refers to a secondary device which can be actuated by a guide curve 9 in order to open and to close the blow moulding station on its path through the clean chamber 20, in order in particular to insert the preform of plastic into the blow moulding station and in order also to remove it again. A guide curve 9 here is also arranged within the clean chamber 20. However, it would also be possible, for example, for just a section 11 already to lead out of the clean chamber 20 below the individual blow moulding stations 8.

The conveying device 2 can have still further elements which are arranged above the clean chamber 20.

The carrier 26 here is arranged in a fixed manner on a holding body 29, and this holding body in turn is movable relative to the base 13. Reference symbol 27 here refers to a further sealing device which also effects, in this region, sealing of the regions 13 and 29 which are movable relative to one another.

Reference symbol 5 refers to a stretching rod which is movable relative to the blow moulding station, in order to stretch the preforms of plastic 10 in their longitudinal direction. A slide 12 here, relative to which the stretching rod is movable in the direction Y, is arranged on the cover 17 here. Reference symbol 21 refers to a further holding means for this slide 12 of the stretching rod 5.

It can be seen that certain regions of the stretching rod are both outside the clean chamber 20 and within the clean chamber 20 during the blow moulding operation. For this purpose, it is possible for a protective device, such as a folding bellows, which surrounds the stretching rod 5 to be provided outside the clean chamber 20 or above the slide 12, so that no region of the stretching rod 5 comes directly into contact with the outside surroundings. Reference symbol U identifies the (non-sterile) surroundings of the clean chamber 20. Reference symbol 28 identifies a carrier for carrying a base form, which is likewise a constituent of the blowing mould. This carrier likewise can be moved here in the direction Y.

Reference symbol 55 refers to a sterilization device, which here is preferably arranged inside the clean chamber 20 and serves to sterilize the individual shaping stations or constituents of these shaping stations 8. This sterilization device 55 here can charge the shaping stations 8, for example, with hydrogen peroxide or another sterilization agent. The sterilization device 55 here can be arranged in a stationary manner, and the shaping stations can move relative to this sterilization device 55. This sterilization device or charging device 55 can be on the conveying wheel 2 or on the standing wall 18 or can be generally arranged in a stationary manner and can comprise dies or the like. It is furthermore advantageous to introduce sterile air via the ventilation system into the clean chamber 20 for sterilizing the clean chamber 20.

The blowing moulds (not shown) are arranged within the blowing mould carrier 6. More precisely, two blowing mould carrier parts which are swivellable relative to one another and which each hold a blowing mould part can be arranged here. By this swiveling operation, the blowing moulds can be opened for introduction of preforms of plastic and for removal of finished blow moulded containers. These blowing mould carriers and blowing moulds here are likewise arranged within the clean chamber.

However, it would also be possible (differently to that shown in FIG. 2) and preferable for the conveying device 2 or the carrier to have a C-shaped outer circumference, which also partly forms the external walls of the clean chamber. This C-shaped clean chamber wall therefore rotates here with the conveying device 2, i.e. the blow moulding wheel. In this embodiment the lower boundary of the clean chamber is at a distance from the base 13 and moves relative to the base. In this manner, the clean chamber can be even smaller in design than shown in FIG. 2. Sealing off of this C-shaped profile of the conveying device, which here forms both an internal wall and a lower and upper cover for the clean chamber, preferably takes place here only with respect to the external wall of the clean chamber. This external wall here is advantageously arranged in a stationary manner.

FIG. 3 shows a partial representation of an apparatus 1 according to the invention. The carrier 2, within which a clean chamber 20 is formed, can be seen in turn here, this clean chamber 20 being of a channel-like design. A plurality (only one shown) of blowing moulds 4 is arranged within the carrier, each of which are held on carriers 6. More precisely, only one blowing mould part 4, which is arranged on a blowing mould carrier part, is shown in FIG. 3. A corresponding second blowing mould part and a corresponding carrier part are not shown in FIG. 3. The blowing mould carrier 6 is arranged here on a swivellable shaft 58. The end sections 58a and 58b of this shaft project out of the sterile chamber 20 here through the cover 17 and the base 52. Actuation of the swiveling shaft 58 from the outside, i.e. from outside the clean chamber 20, is possible in this manner.

The cover 17 and the base 52 are constructed here as one part with the wall 19. These three walls are each a constituent of the carrier designated in its entirety with 2. It can be seen that the swiveling shaft 58 is arranged on the wall 17 and 52. For this reason these walls must likewise be very massive in construction. During operation, the walls 17, 19 and 52 move and in contrast the external wall 18 is arranged in a standing manner. It would be conceivable for the external wall 18 to be less stable or massive in construction than the further walls 17, 19 and 52, since this external wall 18 is not subjected to such high forces. Reference symbol 25 again identifies the sealing device in order to seal off the movement of the standing wall 18 relative to the movable wall 52. A corresponding sealing device can also be provided for sealing off the standing wall 18 from the cover 17.

Since, as mentioned, the walls 17, 19, 52 are each constituents of the carrier 2 and are to be very massive in construction, it is now proposed that these walls are temperature-controlled before the charging with a sterilization medium. This temperature control here can be carried out in various ways. Thus, for example, a heating device 72 can be arranged on the inside, i.e. the side of the wall 19 facing the axis of rotation (and facing away from the clean chamber 20), in order to heat the carrier or the wall 19 in this manner. Corresponding heating devices could also be arranged on the cover 17 or under the base 52.

Reference symbol 54 identifies an opening arranged in the cover, for example in order to introduce a stretching rod into the particular blowing moulds, or in order to guide a blow moulding die to the preforms of plastic. Reference symbol 56 identifies an opening in the base 52, for example in order also to provide the blowing mould 4 with a base part (not shown), which adjoins the blowing mould parts or can be removed from these. The drives for this base form and preferably also for the stretching rod and/or a blow moulding die here can be outside the clean chamber 20. It would furthermore be possible to seal off these components, for example by means of folding bellows and the like.

FIG. 4 shows an embodiment for achieving heating. In this, bores 62 for a temperature control medium are arranged in the carrier 2 or the side wall 19. A temperature control medium for temperature control of the wall 19, for example warm or hot oil or also water, can be sent through these bores in order to heat the carrier 2, more precisely the walls 19, 17 and 52, in this manner. Corresponding temperature control medium bores could also be arranged in the regions 17 and 52. Continuous bores which extend through all three walls 17, 19 and 52 could also be provided.

FIG. 5 shows a further embodiment of an apparatus according to the invention. In this, the carrier 2 has a base body 2a and a temperature control device 64, which can be constructed, for example, as a thin wall of sheet metal. An air gap 66 can be formed between the base body 2a and this temperature control body 64, which effects insulation between the temperature control body 64 and the base body 2a. Air, for example, or also a further insulating medium can be arranged in this region or gap 66. It is possible in this manner to charge the temperature control body 64 with heat, for example with hot steam, in a relatively short time without the base body 2a also thereby having to be heated at the same time. It can be seen that the temperature control body 64 also extends below the cover 17 and a corresponding gap 66 is also formed here. It would also be possible also to arrange the temperature control body in the region of the base 52 and thereby here also to provide again a corresponding insulating space 66.

The applicant reserves the right to claim all the features disclosed in the application text as essential to the invention where they are, individually or in combination, novel with respect to the prior art.

LIST OF REFERENCE SYMBOLS

1 Device
2 Carrier
2a Base body
4 Blowing mould
6 Blowing mould carrier

9 Guide curve
10 Preforms of plastic
10a Container
11 Secondary device
12 Slide
13 Base
17 Cover
18 Wall
19 Side wall, section
20 Clean chamber
22 Feed device
23 Holding device
24 Removal device
25 Sealing device
26 Carrier
27 Sealing device
28 Carrier (for base form)
29 Holding body
30 Heating device
31 Heating elements
32 Sterilization device
34 Conveying device
36 Transfer unit
37 Conveying wheel
40 Filling device
42 Transfer unit
44 Conveying unit
50 Arrangement
52 Base, wall
54, 56 Opening
55 Sterilization device
58 Shaft
58a, 58b End sections
62 Bores
64 Temperature control device
66 Gap, insulating space
72 Heating device
X Axis
Y Direction
U Surroundings

The invention claimed is:

1. An apparatus for shaping preforms of plastic to produce containers of plastic, said apparatus including a heating station for pre-heating the performs, and a transfer station for transferring the heated perform to a movable carrier, comprising a plurality of shaping stations which are arranged on the movable carrier, wherein the shaping stations each have blowing moulds and stretching rods which are arranged in blowing mould carriers and serve to accommodate the pre-heated preforms of plastic and within which the pre-heated preforms of plastic can be shaped to produce the containers of plastic, said apparatus further comprising a clean chamber, within which the pre-heated preforms, blowing moulds and stretching rods are conveyed by the blowing mould carriers, wherein the clean chamber is separated from the surroundings (U) by at least one wall, and has a source of gaseous hydrogen peroxide which charges regions lying within the clean chamber with a hydrogen peroxide gas for sterilization thereof
wherein
a heating device is provided by which regions of the clean chamber to be sterilized including walls of the clean chamber, as well as blow moulds stretching rods, and blowing mould carriers, are heated at least in part to a temperature which is greater than 40° C., and wherein the heating device is arranged on a side of the carrier facing away from the clean chamber.

2. The apparatus according to claim 1,
wherein
at least one wall forming the boundary of the clean chamber is formed by a region of the carrier.

3. The apparatus according to claim 1,
wherein
the apparatus has an electrically operated heating device for heating the regions.

4. The apparatus according to claim 1,
wherein
bores for carrying a temperature control medium are provided in the movable carrier.

5. The apparatus according to claim 1,
wherein
the movable carrier has a base body and, on a surface facing the clean chamber, a temperature control body is arranged in a predetermined position with respect to the base body.

6. The apparatus according to claim 5,
wherein
an insulating medium is arranged between the base body and the temperature control body.

7. The apparatus according to claim 1,
wherein
the mould carriers have bores for carrying a temperature control medium for heating the mould carriers and a feed device in order to feed a heated temperature control medium to the bores.

8. The apparatus according to claim 1, wherein a heating device is arranged on an inside of a wall facing away from the clean chamber.

9. The apparatus according to claim 1, wherein heating devices are arranged non-uniformly in the clean chamber.

10. The apparatus according to claim 1, wherein heating devices are arranged on a cover and/or under the base of the clean chamber.

11. The apparatus according to claim 1, wherein the heating device comprises a heating mat or heating wires for heating parts of walls of the clean chamber.

12. An apparatus for shaping preforms of plastic to produce containers of plastic, said apparatus comprising heating stations for pre-heating the preforms, and a transfer station for transferring the heated preforms to a movable carrier, a plurality of shaping stations which are arranged on the movable carrier, wherein the shaping stations each have blowing moulds and stretching rods which are arranged in blowing mould carriers and serve to accommodate the preheated preforms of plastic and within which the pre-heated preforms of plastic can be shaped to produce the containers of plastic, said apparatus further comprising a clean chamber, within which the pre-heated preforms, blowing moulds and stretching rods are conveyed by the blowing mould carriers, wherein the clean chamber is separated from the surroundings (U) by at least one wall, and has a source of gaseous hydrogen peroxide which charges regions lying within the clean chamber with a hydrogen peroxide gas for sterilization thereof
wherein
a heating device is provided by which the blowing mould carriers and regions of the clean chamber to be sterilized including walls of the clean chamber, as well as blow moulds stretching rods, and blowing mould carriers, are heated at least in part, and wherein the heating device is arranged on a side of the carrier facing away from the clean chamber.

13. The apparatus according to claim 12, wherein
at least one wall forming the boundary of the clean chamber is formed by a region of the carrier.

14. The apparatus according to claim 12, wherein
the apparatus has an electrically operated heating device for heating the regions.

15. The apparatus according to claim 12, wherein
bores for carrying a temperature control medium are provided in the movable carrier.

16. The apparatus according to claim 12, wherein
the movable carrier has a base body and, on a surface facing the clean chamber, a temperature control body is arranged in a predetermined position with respect to the base body.

17. The apparatus according to claim 16, wherein
an insulating medium is arranged between the base body and the temperature control body.

18. The apparatus according to claim 12, wherein
the mould carriers have bores for carrying a temperature control medium for heating the mould carriers and a feed device in order to feed a heated temperature control medium to the bores.

19. The apparatus according to claim 12, wherein
a wall of the carrier is heated to a temperature which is greater than 40° C., by heating the device.

* * * * *